United States Patent [19]

Becerra et al.

[11] Patent Number: 5,745,130
[45] Date of Patent: Apr. 28, 1998

[54] SYSTEM FOR SENSING THE TEMPERATURE OF A PRINTHEAD IN AN INK JET PRINTER

[75] Inventors: Juan J. Becerra; Christopher R. Morton, both of Webster; Thomas A. Tellier, Wolcott, all of N.Y.

[73] Assignee: Xerox Corporation, Stamford, Conn.

[21] Appl. No.: 570,024

[22] Filed: Dec. 11, 1995

[51] Int. Cl.$^6$ ................................................ B41J 2/125
[52] U.S. Cl. ............................. 347/14; 347/17; 374/141
[58] Field of Search ............................. 347/14, 17, 19, 347/13; 374/170, 180, 141

[56] References Cited

U.S. PATENT DOCUMENTS

| Re. 32,572 | 1/1988 | Hawkins et al. | 156/626 |
|---|---|---|---|
| 4,464,067 | 8/1984 | Hanaoka | 374/170 |
| 4,571,599 | 2/1986 | Rezanka | 346/140 R |
| 4,910,528 | 3/1990 | Firl et al. | 346/1.1 |
| 4,980,702 | 12/1990 | Kneezel et al. | 346/140 R |
| 5,075,690 | 12/1991 | Kneezel | 346/1.1 |
| 5,168,284 | 12/1992 | Yeung | 346/1.1 |
| 5,172,142 | 12/1992 | Watanabe et al. | 346/140 R |
| 5,220,345 | 6/1993 | Hirosawa | 346/1.1 |
| 5,221,397 | 6/1993 | Nystrom | 156/273.5 |
| 5,223,853 | 6/1993 | Wysocki et al. | 346/1.1 |
| 5,300,968 | 4/1994 | Hawkins | 347/12 |
| 5,315,316 | 5/1994 | Khormaee | 346/1.1 |
| 5,388,134 | 2/1995 | Douglass et al. | 377/25 |
| 5,467,113 | 11/1995 | Ishinga et al. | 347/17 |

OTHER PUBLICATIONS

"Design with Operational Amplifiers and Analog Integrated Circuits", Sergio Franco, McGraw–Hill Publishing Co., pp. 317 and 354, 1988.

*Primary Examiner*—Benjamin R. Fuller
*Assistant Examiner*—Craig A. Hallacher

[57] ABSTRACT

The invention describes a temperature sensing system which provides a digital signal representative of the temperature of an ink jet printhead during a predetermined time period. In one embodiment, a temperature controlled oscillator is formed on the printhead, the oscillator including a resistor whose resistance varies proportional to printhead temperature variations. An analog signal from the resistor representative of printhead temperature is converted by the oscillator into a digital output signal whose frequency varies with variations in the resistor and, therefore, with the printhead temperature. The oscillator outputs are counted in an electrical counter over a sampling period. The accumulated count is converted into a digital code representing the printhead temperature. This byte is available for comparison with predetermined values stored in a look-up table and is converted into electrical image signals sent to the printhead which are adjusted and compensate for changes in the volume of ink ejected by the printhead nozzles.

In a preferred embodiment, the oscillator counter and synchronizing circuitry are formed on one chip located on the printhead. The printhead can be either a single partial width printhead located on a carriage which is moved through a print zone or a full width printhead. The temperature sensing circuit has a high signal to noise ratio resulting in a more accurate temperature measurement. Because of the noise immunity, the sensing can take place during a print operation.

2 Claims, 7 Drawing Sheets

SYSTEM FOR SENSING THE TEMPERATURE OF A PRINTHEAD IN AN INK JET PRINTER

BACKGROUND AND MATERIAL DISCLOSURE STATEMENT

The present invention relates to an ink jet printer and, more particularly, to a system and method for sensing the operating temperature of a printhead and representing said temperature by means of a digital signal generated within the sensing circuitry.

Ink jet printers eject ink onto a print medium such as paper in controlled patterns of closely spaced dots. To form color images, multiple ink jet printheads are used, with each head being supplied with ink of a different color from an associated ink container. Thermal ink jet printing systems use thermal energy selectively produced by resistors located in ink filled channels or chambers near channel terminating nozzles. Firing signals are applied to the resistors through associated drive circuitry to vaporize momentarily the ink and form bubbles on demand. Each temporary bubble expels an ink droplet and propels it toward a recording medium. The printing system may be incorporated in either a carriage type printer or a pagewidth type printer. A carriage type printer, such as the type disclosed, for example, in U.S. Pat. No. 4,571,599 and U.S. Pat. Re. No. 32,572, generally include a relatively small printhead containing ink channels and nozzles. The contents of these patents are hereby incorporated by reference. The printhead is usually sealingly attached to an ink supply container and the combined printhead and container form a cartridge assembly which is reciprocated to print one swath of information at a time on a stationarily held recording medium, such as paper. After the swath is printed, the paper is stepped a distance equal to the height of the printed swath, so that the next printed swath will be contiguous therewith. The procedure is repeated until the entire page is printed. The pagewidth printer has a stationary printhead having a length equal to or greater than the width of the paper. The paper is continually moved past the pagewidth printhead in a direction normal to the printhead length at a constant speed during the printing process. An example of a pagewidth printer is found in U.S. Pat. No. 5,221,397, whose contents are hereby incorporated by reference.

A known problem with thermal ink jet printers is the degradation in the output print quality due to increased volume of ink ejected at the printhead nozzles resulting from fluctuations of printhead temperatures. These temperatures produce variations in the size of the ejected drops which result in the degraded print quality. The size of ejected drops varies with printhead temperature because two properties that control the size of the drops vary with printhead temperature: the viscosity of the ink and the amount of ink vaporized by a firing resistor when driven with a printing pulse. Printhead temperature fluctuations commonly occur during printer startup, during changes in ambient temperature, and when the printer output varies.

When printing text in black and white, the darkness of the print varies with printhead temperature because the darkness depends on the size of the ejected drops. When printing gray-scale images, the contrast of the image also varies with printhead temperature because the contrast depends on the size of the ejected drops. When printing color images, the printed color varies with printhead temperature because the printed color depends on the size of all the primary color drops that create the printed color. If the printhead temperature varies from one primary color nozzle to another, the size of drops ejected from one primary color nozzle will differ from the size of drops ejected from another primary color nozzle. The resulting printed color will differ from the intended color. When all the nozzles of the printhead have the same temperature but the printhead temperature increases or decreases as the page is printed, the colors at the top of the page will differ from the colors at the bottom of the page. To print text, graphics, or images of the highest quality, the printhead temperature must remain constant.

Various printhead temperature controlling systems and methods are known in the prior art for sensing printhead temperature and using sensed temperature signals to compensate for temperature fluctuations or increases.

U.S. Pat. No. 4,910,528 discloses an analog temperature sensing system wherein a thin film temperature resistor is codeposited on a substrate with the resistors that are heated to expel ink droplets from printhead nozzles. The voltage drop outputs across the temperature resistor are sent to a temperature prediction circuit which controls the print strategy to maintain the printhead temperature within a predetermined operating range.

U.S. Pat. No. 5,075,690 discloses an analog temperature sensor for an ink jet printhead which achieves a more accurate response by forming the thermistor on the printhead substrate and of the same polysilicon material as the resistors which are heated to expel droplets from the printhead nozzles.

U.S. Pat. No. 5,220,345 discloses a printhead temperature control system which places a plurality of temperature detectors at different positions and monitors the temperature differences to control ink supplied to the associated ink channels.

U.S. Pat. No. 5,315,316 discloses a printhead temperature control circuit which includes a temperature sensor formed on the printhead substrate. Analog signals from the sensor are delayed and analyzed by a data processor. A temperature summing operation is performed during a print operation, the sum compared to a previously stored value to determine whether ink flow through the printhead is sufficient for continued printing.

U.S. Pat. No. 5,172,142 senses changes in a temperature sensor to change the driving frequency of the printhead. Analog signals from the sensor are converted into digital signals which are sent to a sequence controller controlling operation of a pulse motor driver.

U.S. Pat. No. 5,168,284 discloses a closed loop system which produces non-printing pulses in response to a difference between a reference temperature signal and printhead temperature signals produced by a temperature sensor located on the printhead.

U.S. Pat. No. 5,223,853 to Wysocki et al. discloses a method of controlling the spot sizes printed by a thermal ink jet printer. The temperature of the ink in the printhead is sensed and a combination of power level and time duration of the electrical input signal to the heating elements is selected by entering the sensed temperature of the ink into a predetermined function relating to the energy of the input signal to the corresponding resulting size of the spot on the copy sheet.

Those prior art disclosures which form the temperature sensor on the printhead typically require high voltage and circuit switches and are prone to erroneous temperature correction feedback signals due to the low signal to noise ratio. If the temperature sensing signals are generated during a printing swath, excessive noise affects the ratio. In some applications, the printing carriage is stopped at the end of a swath to generate the output analog temperature signals to avoid the noise generated during scan. A system such as as this, however, results in decreased throughput. In addition, the conversion of the temperature signal from an analog to a digital output requires extra logic circuitry to be located in the printer. Further, initial calibration requires additional electrical components such as trimming resistors.

SUMMARY OF THE INVENTION

It is, therefore, one object of the invention to provide a system for sensing printhead temperature which has a high noise immunity.

It is a further object to provide printhead sensing circuitry which generates digital signals representative of printhead temperature.

It is a still further object to form circuitry for generating digital signals representative of printhead temperature on a single chip located on the printhead.

These and other objects are realized by providing circuitry and enabling software capable of directly producing a digital signal representative of the real time temperature of the printhead as measured during a printing swath and feeding this signal back to the circuits controlling the electrical input signals to the printhead. In one described embodiment, a printhead is conventionally mounted on a print carriage adapted to record images during a print swath. A temperature controlled oscillator is formed on the printhead. The oscillator is triggered into operation and generates output digital signals having a frequency which varies in proportion to the printhead temperature. These digital output signals from the oscillator are clocked into a counter. The counter accumulates the number of pulses occurring over a predetermined sampling period. The counter value, which is a direct binary representation of printhead temperature, is sampled at the end of the time period. A digital signal, representing the printhead temperature, is fed back to a system controller where it is converted into an adjusted electrical signal that is applied to the printhead drive circuitry. The adjusted signal adjusts the pulse width and/or power of the drive signals to the heater resistors of the printhead to maintain the required spot diameter of the drops expelled to the recording medium. The correction for increased temperature is generally to shorten the pulse width to reduce the diameter and hence volume of the ejected ink spots. In a typical application, as print operation progresses, printhead temperature rises, causing ejected ink spot size to increase. Computer signals are generated to reduce the pulse width of the drive signal to reduce the spot size.

In a preferred embodiment, an oscillator operation is enabled by applying a relatively large (3 v–5 v) triggering signal instead of the conventional 10 mv–100 mv signal of the prior art. Noise is considerably reduced over the analog schemes. The result is a higher signal to noise ratio and relative noise immunity. In addition, the pulse counting acts as a noise filter which reduces measurement error due to switching noise.

More particularly, the present invention relates to a thermal ink jet printer comprising:

a printhead for ejecting droplets of ink in response to selectively applied electrical input signals, means for sensing the temperature of the printhead, said sensing means including:

circuitry for generating binary output pulse signals whose frequency varies with variations in printhead temperature, a counter for counting the output pulse signals over a predetermined time period and means for converting the count at the end of the predetermined period into a digital multi-bit signal representative of the printhead temperature.

DESCRIPTION OF THE INVENTION

Figure 1:
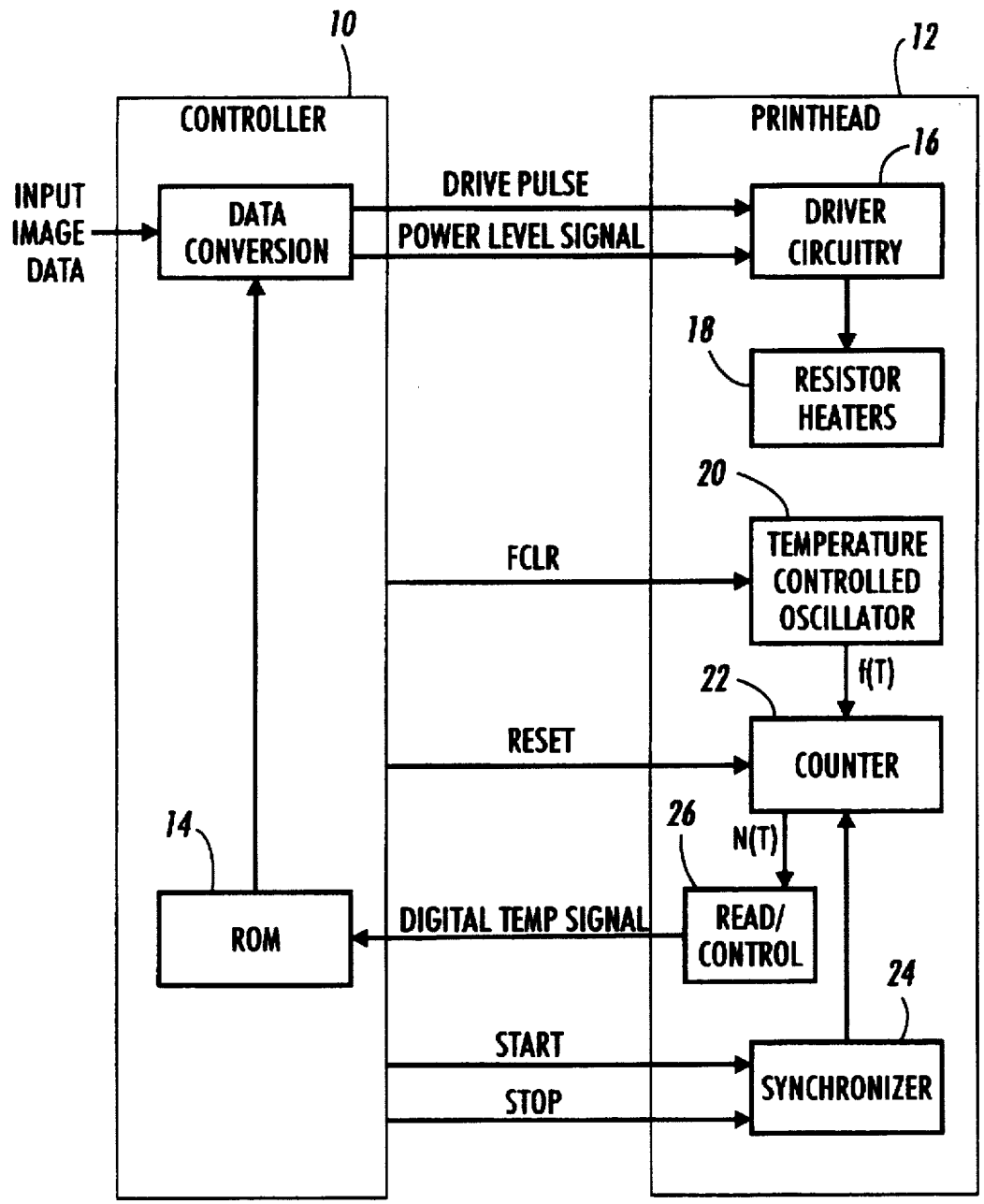
FIG. 1 is an electrical block diagram showing the circuitry for sensing changes in printhead temperature including a counter for counting output signals from a temperature controlled oscillator.

Referring now to FIG. 1, there is shown a simplified block diagram of a portion of a thermal ink jet printer that employs the temperature sensing techniques of the invention. The invention can be used in a printer of the type disclosed in U.S. Pat. No. 4,980,702 and U.S. Pat Re. No. 32,572, modified according to the principles of the invention is described below. These patents are hereby incorporated by reference. A controller 10 receives input image data signals from an image data source such as a computer (not shown). The controller processes the print data in a data conversion circuit to provide print control information to a printhead 12. Controller 10 conventionally comprises a CPU, a ROM 14 for storing programs and a RAM. The controller, besides performing the temperature sensing and correction functions described below, also controls operation of the print carriage on which printhead 12 is mounted, the movement of the recording medium as well as system timing functions.

Controller 10 sends heater resistor drive pulses and power level signals to driver circuitry 16 which can be formed on the printhead 12 substrate as shown or can alternatively be in the controller. Driver 16 comprises a plurality of driver transistors for applying the drive signals to associated resistor heaters 18. Driver 16 also includes a plurality of power transistors to control the power level of the drive signals applied to the resistor heaters. It is understood that the drive and power level signals could be applied directly from controller 10 via flexible electric wire cables, as is conventional in the art.

As a print operation is initiated, the scanning carriage carrying printhead 12 is moved back and forth in a scan path with ink being ejected through printhead nozzles when associated resistor heaters are pulsed by signals from driver circuitry 16. As print operation continues, the temperature of printhead 12 may begin to rise affecting the volume of ink being expelled from the nozzles and resulting in increased spot size of the ink ejected onto the recording sheet. According to a first embodiment of the invention, a temperature controlled oscillator 20 is located on the printhead 12 substrate in a location which experiences the temperature variations of the printhead. Oscillator 20 is enabled by a function clear (FCLR) signal from controller 10 and begins to generate a train of output pulses whose frequency is temperature dependent.

Figure 2:
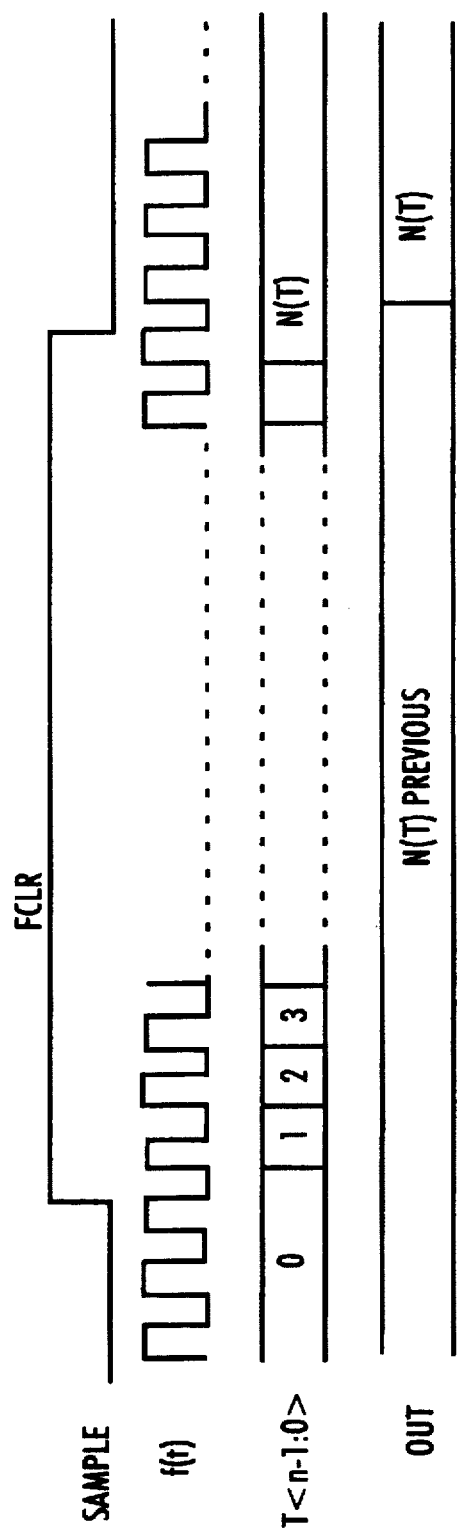
FIG. 2 is a timing diagram of the temperature sensor signals.
Figure 3:
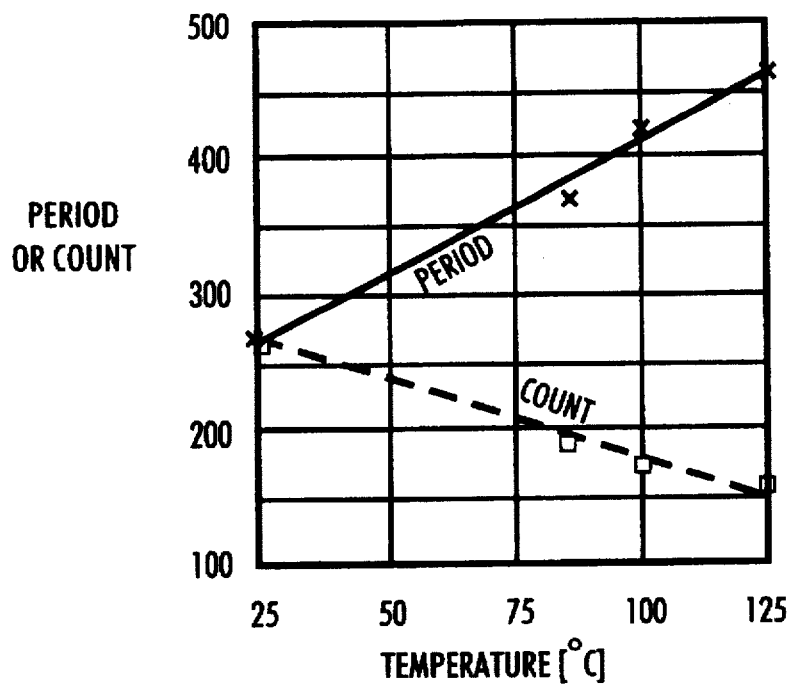
FIG. 3 is a plot of clock or period vs. temperature.

Referring to FIG. 1 and the signal timing diagram of FIG. 2, the oscillator 20 produces a series of rectangular digital output pulses during the time that FCLR is maintained high. These output pulses, of a relatively high amplitude of 3–5 V, are sent to a counter 22. The counter is enable by a start signal from a sequencer (state machine) in controller 10 as applied through a synchronizer circuit 24. The function of the synchronizer circuit is to synchronize the timing operation and prevent the counter from metastabilizing. During the start and stop periods shown in FIG. 2, counter 22 accumulates (counts) the number of pulses occurring during the predetermined period initiated by the start signal and terminated by a stop signal. The contents of counter 22 are clocked out, as N(T) in read control logic circuit 26. The digital output of read/control circuit is a direct binary representation of the printhead temperature as shown by the plot in FIG. 3. FIG. 3 shows a clock period f(T) in nsec plotted vs. count over temperature. A sample duration of 153 microseconds was used to collect about 260 counts at 250° C. As seen, clock period (solid line) increases with temperature causing the total count (dotted line) to decrease.

Continuing with the description of FIG. 1, the digital temperature signal, a digital word or byte, representing printhead temperature, is sent to ROM 14. ROM 14 is loaded with look-up tables which correspond to the temperature sensitive characteristics for resistor heater 18. Processor 10 reads the digital word representative of the sensed printhead temperature and "looks up" the suitable combination of pulse duration and power level to be applied to driver circuitry 16 to compensate for the effects of the temperature change. Further details of loading of ROM 14 are found in U.S. Pat. No. 5,223,853, referenced supra.

To summarize this first aspect of the invention, printhead temperature is sensed by enabling an oscillator, whose output frequency is temperature dependent, for a selected period of printer operation. The output of the oscillator is a train of digital pulses set at a selected relatively high voltage amplitude reducing the signal to noise ratio. The oscillator output pulses are counted during a sampling period by a counter. At the end of the sampling period, the counter value is converted into a byte representative of the printhead temperature. The output byte is sent to look-up tables in a ROM and converted into drive and power signals adjusted to the temperature change; e.g., drop size adjusted to decrease spot size on the recording medium to compensate for temperature rise. According to one feature of the invention, the sensing period can be any time during print operation, even during a print swath, and is not limited to generation of temperature control signals only at the end of a print swath.

Figure 4:
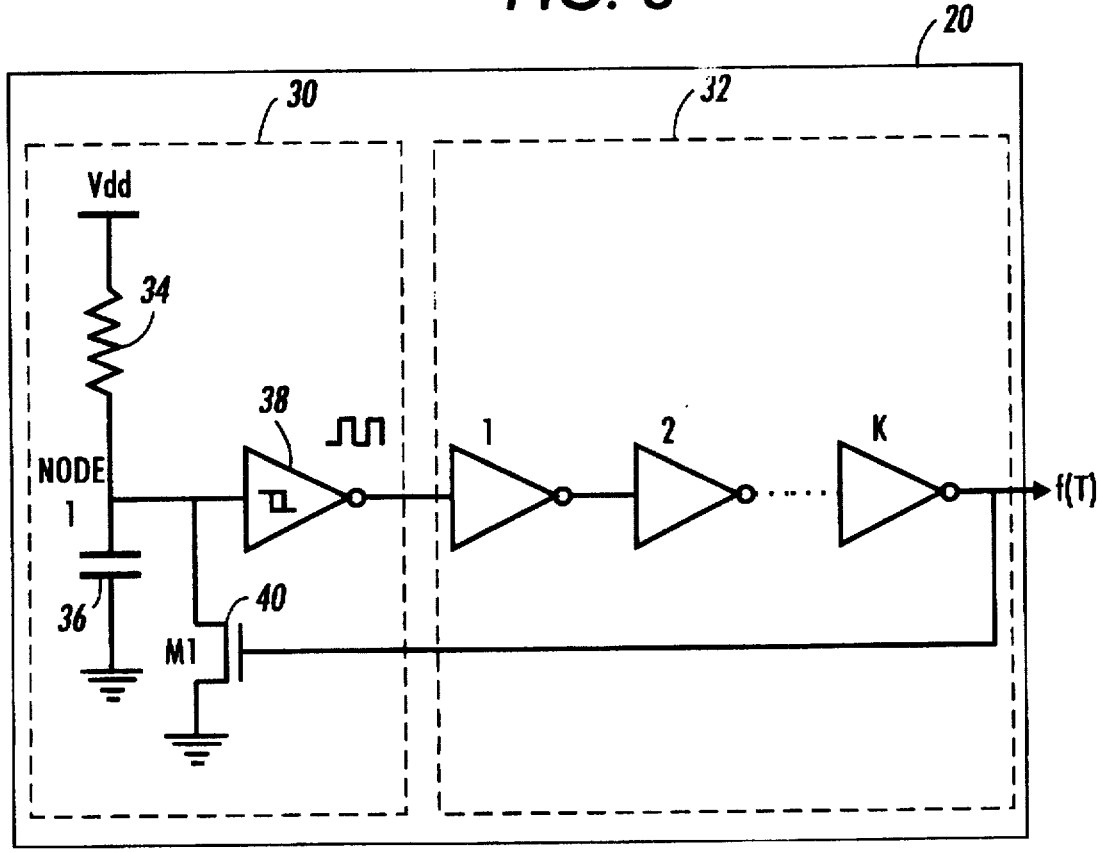
FIG. 4 is a schematic of one embodiment of the temperature controlled oscillator of FIG. 1.

Further elaboration of the FIG. 1 block diagram is provided below in conjunction with descriptions of one form of a temperature controlled oscillator shown as an electrical schematic in FIG. 4. Referring to FIG. 4, oscillator 20 comprises two circuit segments, a timer circuit 30, and an inverter circuit 32. Circuit 30 consists of resistor 34, capacitor 36, Schmitt trigger 38 and Mosfet 40. $V_{dd}$ is the power supply voltage. Trigger 38 is a fast acting on/off switch which generates the rectangular pulses shown in FIG. 2. The output frequency of trigger 38 is determined by the RC circuit but is variable in proportion to the voltage across resistor 34 whose resistance, in turn, varies with print temperature. Inverter circuit 32 contains inverters 1-K which step up the signals to a desired output level. The output of inverters circuit 32 are rectangular pulses at the desired amplitude and is referred to or hereafter as a temperature clock signal f(T).

The period of the temperature clock f(T) is defined as $$P = -R_0[1 + (T - T_0)TCR]C\ln(1 - V_{sw}/V_{dd}) + \sum_{1}^{K} t_{pd} + td_{M1}.$$

$R_O$ is the resistance in timer circuit 30 at a reference temperature, $T_O$. TCR is the temperature coefficient of resistance of resistor 34=$R_O$ [1+(T−$T_O$) TCR]. C is the capacitance in the timer circuit, including the value of capacitor 36 and the input capacitance of Schmitt trigger 38. $V_{sw}$ is the switching threshold of the Schmitt trigger. $V_{dd}$ is the voltage at the power supply. The sum of the propagation delays, $t_{pd}$, of the K inverters must be added to the oscillation period. The time $td_{M1}$ is required for Mosfet 40 to discharge node 1. The value of R, C and Vsw is set such that:

$$-R_0[1+(T-T_O)TCR]C\ln(1-V_{sw}/V_{dd}).>>\Sigma t_{pd}+td_{M1}. \quad \text{(Eq. 1)}$$

Therefore, $$P=-R_0[1+(T-T_O) TCR]C \ln(1-V_{sw}/V_{dd}). \quad \text{(Eq. 2)}$$

and, $$\partial P/\partial T=-R_OCTCR \ln(1 -V_{sw}/V_{dd}). \quad \text{(Eq. 3)}$$

It is important to note that even though $\Sigma t_{pd}$ +$td_{Mt}$ is negligible with respect to the clock period, this value must be large enough such that the minimum pulse width of f(T) is met for the counter circuit. The temperature dependent clock frequency, f(T), or a derivative of f(T) is used to drive counter circuit 22. The nominal frequency will be about 590 ns ±3 ns at 25° C. The configuration of FIG. 4 is exemplary only; modifications can be made consistent with the purposes of the invention. For example, two timer circuits can be used to minimize the effects of the noise on the trigger point of the timer enabling a shorter RC time constant.

OPERATIONAL SEQUENCE

Figure 5:
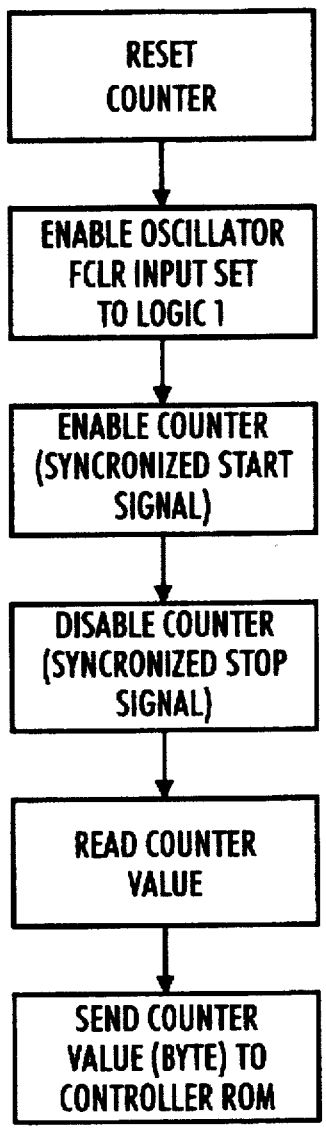
FIG. 5 is an operational flow diagram for generation of a digital signal proportional to printhead temperature.

Referring to FIGS. 1–4 and to the flow diagram of FIG. 5, a counter reset signal is sent from the controller to counter 22. Counter 22, in a preferred embodiment, is a 9 bit counter plus one overflow bit. The counter can, therefore, record $2^9$=512 pulses. Oscillator 20 is enabled by an FCLR signal which has a high time of 4.25 microseconds ×34 enable cycles for a total on time of 144.5 microseconds. The temperature clock signal f(T) drives counter 22 during a sample period defined by start and stop signals from controller sequence circuitry via synchronizer circuit 24. The synchronizer delay from start to stop, shown in the counter timing of FIG. 2, depends on the relative timing at the clock synchronization. A minor error is introduced by the delay from the time the sequencer activates the start/stop sequence to the time the counter actually responds. This introduces some minor errors in the count which is compensated for by providing a delay between the stop signal and the counter readout as shown in the counter timing of FIG. 2.

In one measurement, a temperature sensitivity of f(T) of 1.9 ns/° C. was recorded. The use of synchronizer circuit 24 induces an error of at least 2 significant bits. At the worst case condition of 125° C. junction temperature, the least significant bit of a 9 bit counter corresponds to 1.61° C. At 25° C. the error improves to 0.53° C. per least significant bit. This means that at 125° C. a measurement error of 6.44° C. can be expected. At 2° C., a measurement error of 2.12° C. can be expected. Measurement error due to jitter in FCLR pulse width can be neglected as long as the jitter is held to less than Period f(T)/2. At any rate, the 2 least significant bits can be neglected due to synchronizer error. So the read/control 26 will assemble a byte of information related to temperature; 7 bits for temperature value, and 1 bit indicating counter overflow. Measurements show that f(T) is insensitive to power supply variation from 4.5 to 5.5 V.

The digital output of read/control 26 is reported to the ROM 14 in the controller for conversion into appropriate heater drive signals. A digital temperature representation can be reported to other temperature control mechanisms. For example, circuits to provide cooling to the printhead or to delay printing to provide a cool-down of the printhead.

Further modifications of the embodiments described thus far are possible consistent with the present invention. For example, while only one oscillator was described in conjunction with the FIG. 1 embodiment, two or more oscillators may be formed on the printhead substrate in strategic locations. The oscillators can be connected in series with the output temperature clock signal summed to obtain an averaged f(T). This would result in an even more accurate temperature compensation. In particular for a printer using one or more full width array printbars, distributed temperature controlled oscillators would be desirable.

Figure 6:
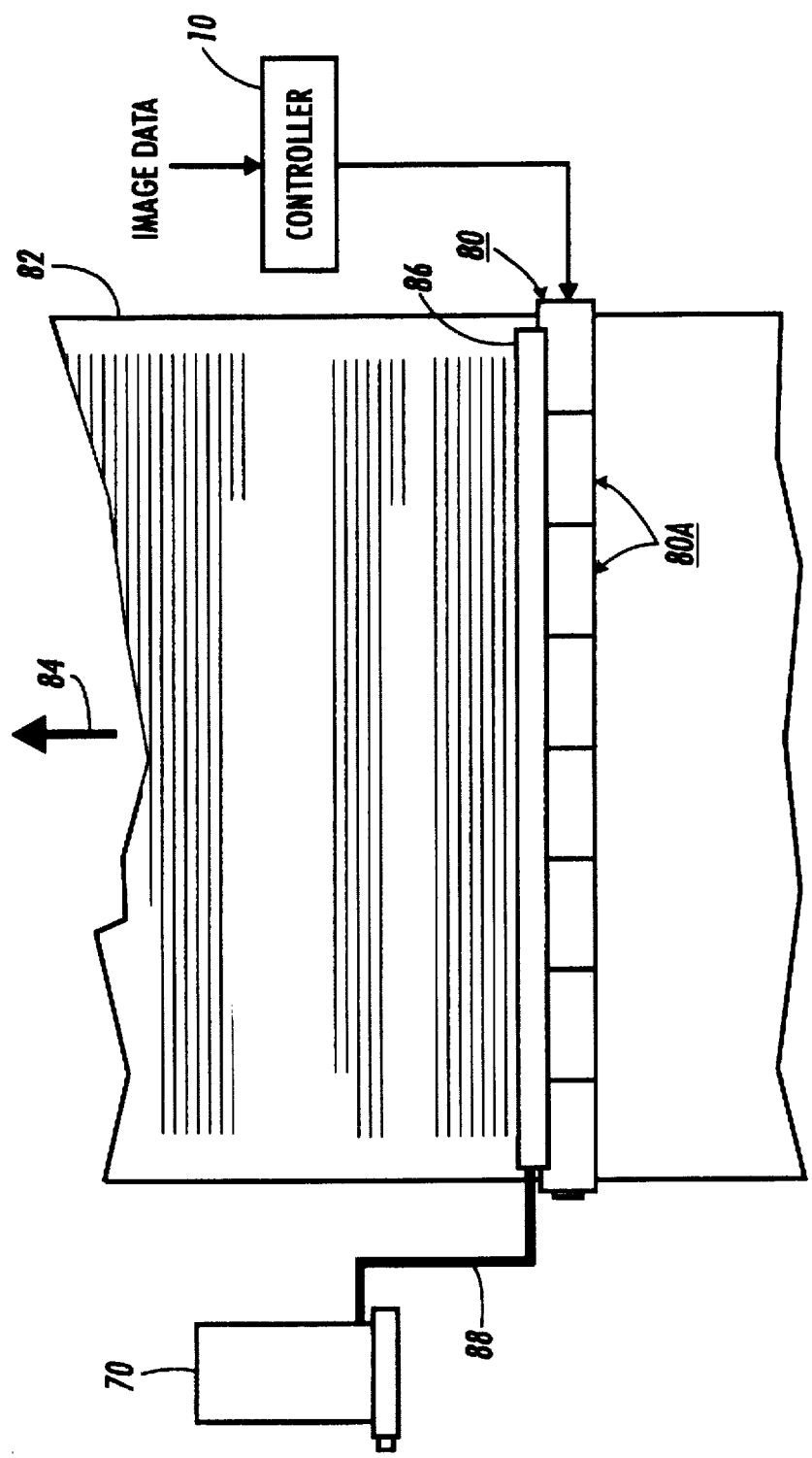
FIG. 6 is a partial schematic of a pagewidth printer.

FIG. 6 shows a pagewidth (full width) ink jet printing system which is supplied with ink from an ink reservoir 70. A full width black printhead 80 is positioned to write on a recording medium 82 which is indexed and moves in the direction of arrow 84. Printhead 80 has been assembled from a plurality of modules 80A which have been butted together to form a 12" array according to the techniques described in U.S. Pat. No. 5,221,397, whose contents are hereby incorporated by reference. Printhead 80, in this embodiment, provides 7,200 nozzles or jets. As described in the '397 patent, the printhead module 80A are formed by butting together a channel array containing arrays of recesses that are used as sets of channels and associated ink reservoirs and a heater wafer containing heater elements and addressing circuitry. The bonded wafers are diced to form the printhead resulting in formation of the jets, each nozzle or jet associated with a channel with a heater therein. The heater is selectively energized to heat the ink and expel an ink droplet from the associated jet. The ink channels are combined into a common ink manifold 86 mounted on the side of printhead 80 and in sealed communication with the ink inlets of the channel arrays through aligned openings. The manifold 86 is supplied with the appropriate ink, black for this embodiment, from an ink cartridge 70 via flexible tubing 88.

Figure 7:
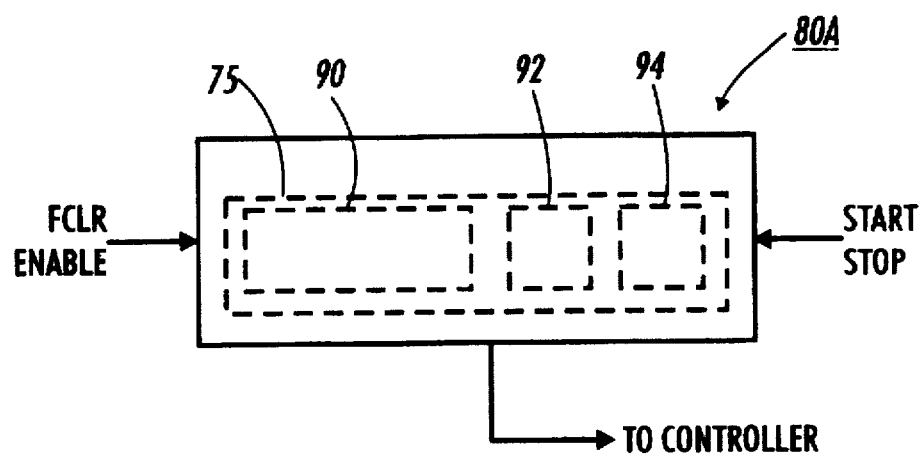
FIG. 7 shows one module portion of the pagewidth printer of FIG. 6. with a temperature control chip formed on the module.

Because of the length of printhead 80, uneven heating may occur along its length. According to another aspect of the invention, two or more temperature control chips 75 may be formed on modules 80A. One module 80A is shown in enlarged view in FIG. 7 with a temperature control chip 75 formed on the printhead substrate. Chip 75 includes a temperature controlled oscillator 90, a counter 92 and synchronizer 94. Inputs to chip 75 are as described in the FIGS. 1 and 6 embodiments, and the operation sequences as described above. Each chip 75 will sense temperature changes of the associated module 80A, and the temperature compensated signals looked up by the controller will be applied to the resistor heaters for that module. When a line recording operation is performed, each resistor associated with a jet in printhead 80 is driven selectively in accordance with image data signals corrected for temperature variations so that the ink droplets of optimum diameter are ejected from the associated jets forming a line of recording on the surface of the recording medium 82.

Figure 8:
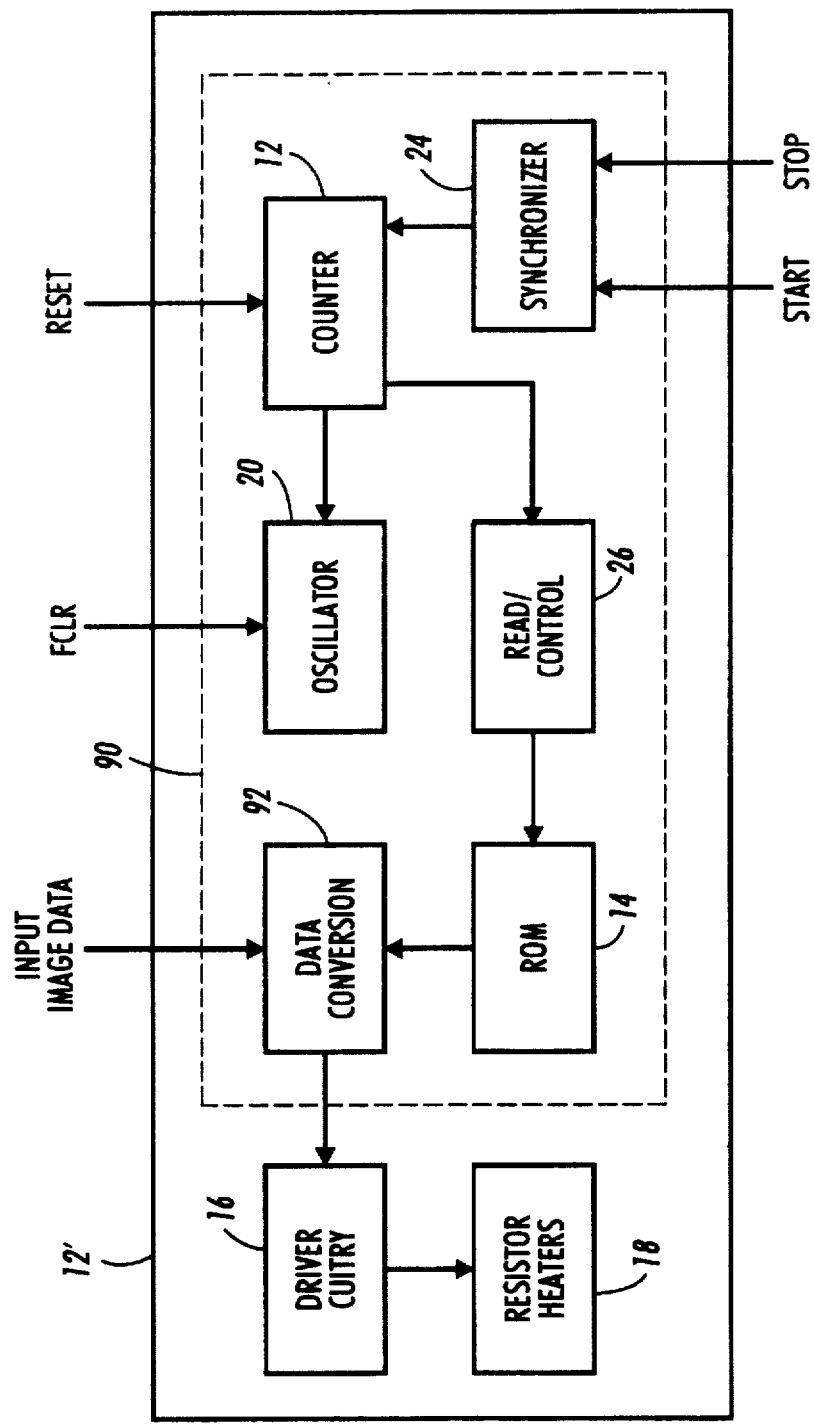
FIG. 8 shows an alternate embodiment of FIG. 1 wherein all temperature sensing circuits are formed on a single chip on the printhead.

While the embodiments disclosed herein is preferred it will be appreciated from this teaching that various alternative modifications, variations or improvements therein may be made by those skilled in the art. For example, the embodiments of the invention shown in FIGS. 1–5 disclose printhead 12 containing the circuitry used to implement the temperature sensing function (oscillator 20, counter 22, read/control 26 and synchronizer 24) formed on the printhead substrate. The look-up and pulse generation adjustment are accomplished using circuitry in the controller 20. FIG. 8 shows a printhead 12 modified so that all of the above-described functions are formed on a single chip 90 on the printhead; e.g., chip 90 contains data conversion 92, oscillator 20, counter 12, synchronizer 24, read/control 26 and ROM 14. Total integration of the temperature sensing function is thus enabled.

What is claimed is:

1. A thermal ink jet printer comprising:

a printhead having a plurality of ink droplet ejectors, each ejector having a heater resistor activated in response to electrical signals selectively applied from an input signal source, a temperature controlled oscillator formed on said printhead, a controller for controlling printhead operations and for applying an enabling signal to said oscillator causing the oscillator to produce binary output pulses whose frequency varies with the temperature variations of the printhead, a counter for counting the output pulse signals during a predetermined time period defined by start and stop signals from said controller applied through a synchronizer circuit which synchronizes timing operation, means for converting a count at the end of the predetermined time period into a digital multi-bit signal representative of the printhead temperature and circuit means responsive to said multi-bit signals for adjusting said electrical signals applied to said heater resistor so as to compensate for ink droplet size and volume changes caused by said temperature variations.

2. The system of claim 1 wherein said synchronizer circuit introduces a predetermined delay between a time when the counter is stopped and the time where the accumulated count is converted into the digital multi-bit binary signal.

* * * * *